US006690146B2

(12) United States Patent
Burgyan et al.

(10) Patent No.: US 6,690,146 B2
(45) Date of Patent: Feb. 10, 2004

(54) HIGH EFFICIENCY LED DRIVER

(75) Inventors: Lajos Burgyan, Mountain View, CA (US); Francois Prinz, San Jose, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 0 days.

(21) Appl. No.: 10/229,602

(22) Filed: Aug. 27, 2002

(65) Prior Publication Data

US 2003/0235062 A1 Dec. 25, 2003

Related U.S. Application Data

(60) Provisional application No. 60/390,734, filed on Jun. 20, 2002.

(51) Int. Cl.[7] .......................... G05F 1/618; G05F 1/565

(52) U.S. Cl. ........................ 323/271; 323/274; 323/303

(58) Field of Search ................................ 323/271, 272, 323/274, 275, 303

(56) References Cited

U.S. PATENT DOCUMENTS 6,522,558 B2 * 2/2003 Henry ........................ 363/60
6,556,067 B2 * 4/2003 Henry ........................ 327/536

* cited by examiner

*Primary Examiner*—Bao Q. Vu
(74) *Attorney, Agent, or Firm*—Sidley Austin Brown & Wood LLP

(57) ABSTRACT

Embodiments of the invention provide for circuits for driving LEDs with consistently good illumination and superior efficiency at lower cost and suitable for use with cheaper LEDs or with LEDs having wide component parameter tolerances over wide operating voltages and temperature variations. Circuits disclosed may be, but need not be, embodied on a single semiconductor chip.

15 Claims, 3 Drawing Sheets

100
101 VIN
Linear Regulator 150
Multi-mode Charge Pump 160
181
102
Osc-illator
180
Mode-change Latch 142
318 VBG
Detector
302
300
120
110
170
143
Bandgap Reference 130
118
113
Vref_01
2-bit DAC 141
140
151 VSS
Linear current regulator 200

200
110
211
220
221
VSS
222
120
213

HIGH EFFICIENCY LED DRIVER

RELATED APPLICATIONS

This application claims priority from provisional patent application No. 60/390,734 entitled HIGH EFFICIENCY LED DRIVER, filed on Jun. 20, 2002 which is assigned to the present assignee and hereby incorporated by reference in its entirety.

FIELD OF THE INVENTION

This invention generally relates to driver circuitry. The invention more specifically relates to a high efficiency LED (light emitting diode) driver.

BACKGROUND OF THE INVENTION

LEDs, and driver circuits to energize them, are well known. The brightness of an LED is directly related to the current applied. The voltage developed across an LED depends primarily upon the semiconductor design and technology used and upon manufacturing tolerances. Where multiple LEDs are used in close proximity, it is often desirable that they operate at fairly matched light output levels. Various circuits and approaches have been previously developed for achieving uniform illumination of LEDs. But these previously developed techniques have suffered from one or more disadvantages. For example, these techniques may have driver circuits operating very inefficiently. Also, the techniques may require LEDs manufactured to a close tolerance or with matched parameters established by testing. This drives up cost.

Energy efficiency is particularly important in portable devices energized by primary cells, such as the familiar alkaline "battery".

BRIEF DESCRIPTION OF THE DRAWINGS

For a more complete understanding of the present invention and for further features and advantages, reference is now made to the following description taken in conjunction with accompanying drawings, in which.

For convenience in description, identical components have been given the same reference numbers in the various drawings.

DETAILED DESCRIPTION OF THE PREFERRED EMBODIMENTS

Figure 1:
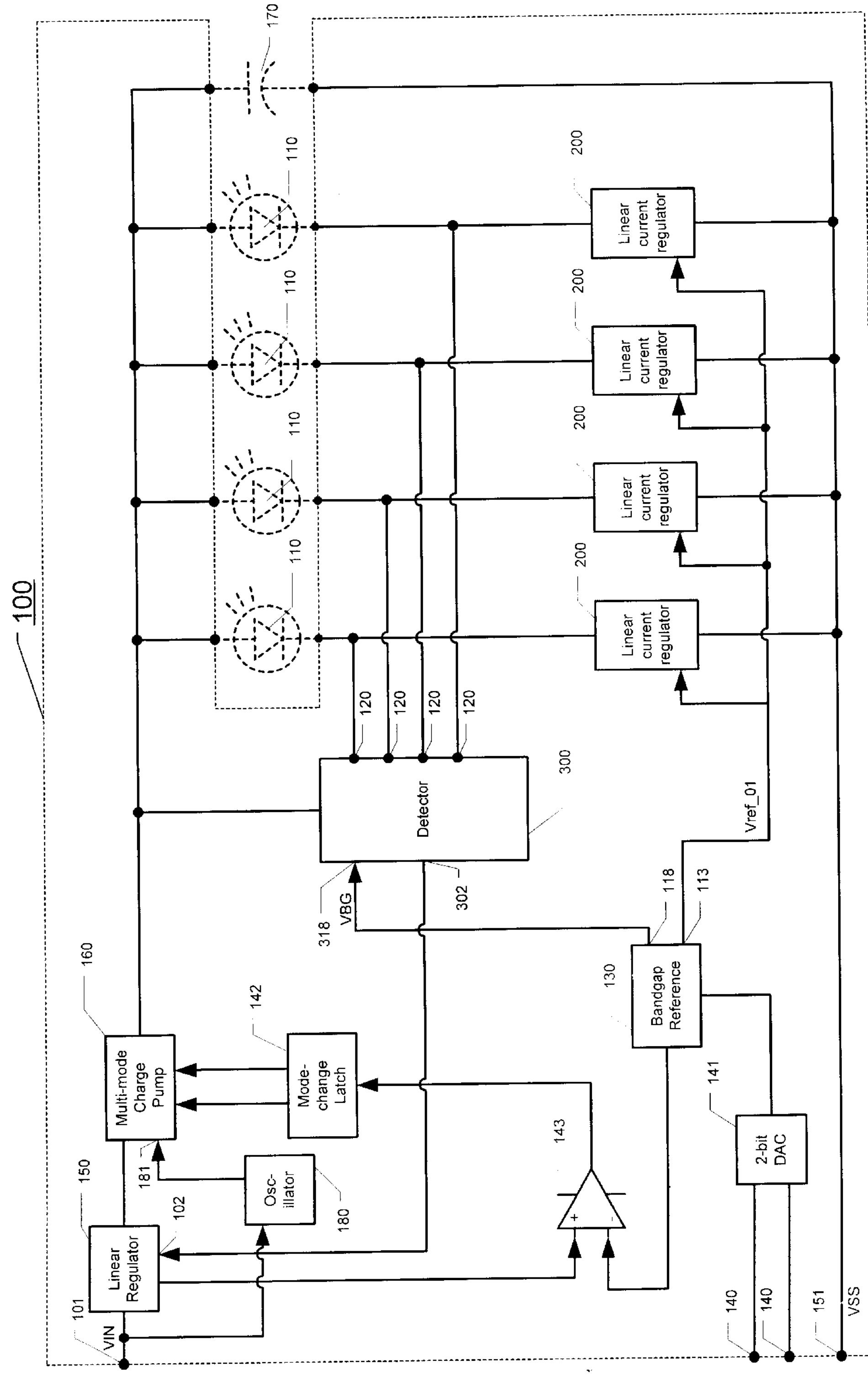
FIG. 1 is a circuit diagram in partial block form of an LED driver circuit according to an embodiment of the invention.

In the following description, for purposes of clarity and conciseness of the description, not all of the numerous components shown in the schematic are described. The numerous components are shown in the drawings to provide a person of ordinary skill in the art a thorough, enabling disclosure of the present invention. The operation of many of the components would be understood and apparent to one skilled in the art.

In various embodiments of the invention, circuits and methods are provided for driving LEDs with consistently good illumination and superior efficiency at lower cost and suitable for use with cheaper LEDs or with LEDs having wide component parameter tolerances over wide operating voltages and temperature variations. The circuits disclosed may be, but need not be, embodied on a single semiconductor chip.

According to an aspect of the invention, a circuit is used for providing current to a plurality of LEDs which may be, but need not be, of the higher operating voltage type sometimes known as "white LEDs" for their broad optical spectrum output. The circuit may comprise a plurality of active current regulators, each controlling current in a single LED, a charge pump supplying current to the plurality of LEDs, a voltage regulator supplying energy to the charge pump and a detector adapted to detect current starvation at any or all of the current limiters. According to a further aspect of the invention, the voltage regulator may have an output that is responsive to detection of current starvation.

According to a still further aspect of the invention, the charge pump may have multiple operating modes, each with distinctive voltage gains. The modes may be selected according to detection of current starvation in order to provide for operation at good efficiency.

According to a further aspect of the invention, a method is provided for illuminating LEDs with relatively uniform brightness and superior overall energy efficiency as compared with previously developed methods.

Other aspects of the invention are possible, and some of them are described below.

FIG. 1 is a circuit diagram in partial block form of an exemplary LED driver circuit 100 according to a particular embodiment of the invention. LED driver circuit 100 may drive multiple LEDs 110 and, in some embodiments, may be implemented on a single integrated circuit or chip. LEDs 110 (shown in dashed outline) may be, but need not be, implemented separately from the chip for mechanical or other reasons. A smoothing capacitor 170, which may be implemented on chip or off chip, generally functions to dampen ripple.

As depicted, the LED driver circuit 100 receives a power supply input voltage VIN at an input voltage terminal 101. A linear regulator 150 is connected to input voltage terminal 101 and has a control terminal 102. Control terminal 102 receives a control input from feedback signal terminal 302 of detector 300. Linear regulator 150 may be implemented, for example, as a single MOS (metal-oxide semiconductor) transistor. Such an embodiment for the linear regulator 150 is relatively energy efficient as is desired to achieve good efficiency for the circuit 100 as a whole.

The control input to linear regulator 150 at control terminal 102 can be generated by a detector 300. The output from linear regulator 150 may be applied to a multi-mode charge pump 160. Multi-mode charge pump 160 also receives a clock signal, which can be a high frequency square wave, at input port 181. The clock signal may be generated by an oscillator 180 which may be energized from voltage VIN at terminal 101. Charge pumps to increase DC (direct current) voltages, such as by capacitor switching, are well-known in the art. Also well-known in the art are multi-mode charge pumps which can operate in any of two or more modes having distinct voltage gains according to the mode selected and voltage gain desired. In one embodiment, multi-mode charge pump 160 is capable of operating in any one of three distinct modes according to binary control signals received from a mode-change latch 142. In an embodiment of the invention, the multi-mode charge pump can operate at voltage gain ratios of 2:1 or 3:2 or as a simple passthrough at 1:1 nominal voltage gain. In practical operation, it is possible that switches in multi-mode charge pump 160 will cause some voltage drops relative to the nominal or theoretical voltage gains. Multi-mode charge pump 160 provides voltage to LEDs 110.

In one embodiment, mode-change latch 142 has a two-bit, unclocked digital output and is responsive to an analog voltage level input. A mode control OpAmp (Operational Amplifier) comparator 143 may generate the analog signal to control the mode change latch 142.

In one embodiment, each LED 110 has an associated current regulator 200. The current passed by regulators 200 is set by reference voltage Vref_01 generated by a bandgap reference circuit 130. Bandgap reference circuits are well known in the art. In the event that the LED supply (e.g., charge pump 160) is sourcing insufficient current to an LED 110, then current starvation in the associated current regulator 200 will occur. This condition may be sensed by detector 300 as under-voltage at one or more of the input ports 120 of the detector 300. When a condition of under-voltage is detected by detector 300, detector 300 acts to control linear regulator 150 so as to increase voltage supplied to charge pump 160. This increases voltage supplied to all of the LEDs 110, thus abating the current starvation and associated under-voltage. Thus, through closed loop control, the voltage supplied to LEDs 110 is maintained at the minimum necessary to avoid current starvation. Since only the minimum voltage is maintained, current starvation will be incipient in the normal operating condition. Although some LEDs 110 may be supplied with more voltage than needed, uniform illumination is maintained because each LED 110 has its own respective current regulator 200.

The supply voltage may be insufficient for current starvation to be abated by action of the linear regulator 150 alone, as may occur for example if the power supply is a primary cell approaching the end of its useful life. In that event, control OpAmp comparator 143 detects that the linear regulator 150 is railed and signals mode change latch 142 to change the multi-mode charge pump 160 to operate in the next higher mode. This next higher mode has a higher voltage gain, and thus restores LED 110 current to a non-starving condition. Detector 300 enables linear regulator 150 to throttle back voltage supply to multi-mode charge pump 160 to the minimum necessary to restore circuit equilibrium. Thus, charge pump 160 is operated with higher gain only when necessary an d hence the circuit operates with best efficiency under the prevailing supply voltage availability. Taken as a whole, the circuit design helps get maximum useful life from a primary cell power source such as may be used to energize typical portable electronic devices. In an exemplary embodiment, mode change latch 142 can act in a complementary manner to cause multi-mode charge pump 160 to operate in a more economical mode with less voltage gain if and when input voltage VIN is restored to a suitably high level.

In an exemplary embodiment, bandgap reference circuit 130 generates fixed voltage references for OpAmp comparator 143 and also a bandgap voltage VBG at reference terminal 118 applied to detector 300 at. terminal 318. Bandgap reference circuit 130 may provide a bandgap voltage of approximately 1.268 volts. In the same embodiment, bandgap reference circuit 130 generates a reference voltage Vref_01 at terminal 113 to control current regulators 200. The magnitude of voltage Vref_01 may be controlled by a 2-bit binary input 140 to DAC (digital to analog converter) 141. The 2-bit binary input control functions to provide a choice of three different LED currents, and hence three different LED brightnesses, plus a dark (or off) setting of no (or negligible) LED current. The choice of brightness might be hard wired or user selectable according to product application. When the circuit 100 is in an "off" condition with the LEDs extinguished, linear regulator 150 throttles back. Nonetheless, a small current may still pass through linear regulator 150. This may serve to pre-charge capacitor 170, thus avoiding a possibly excessive startup transient.

Figure 2:
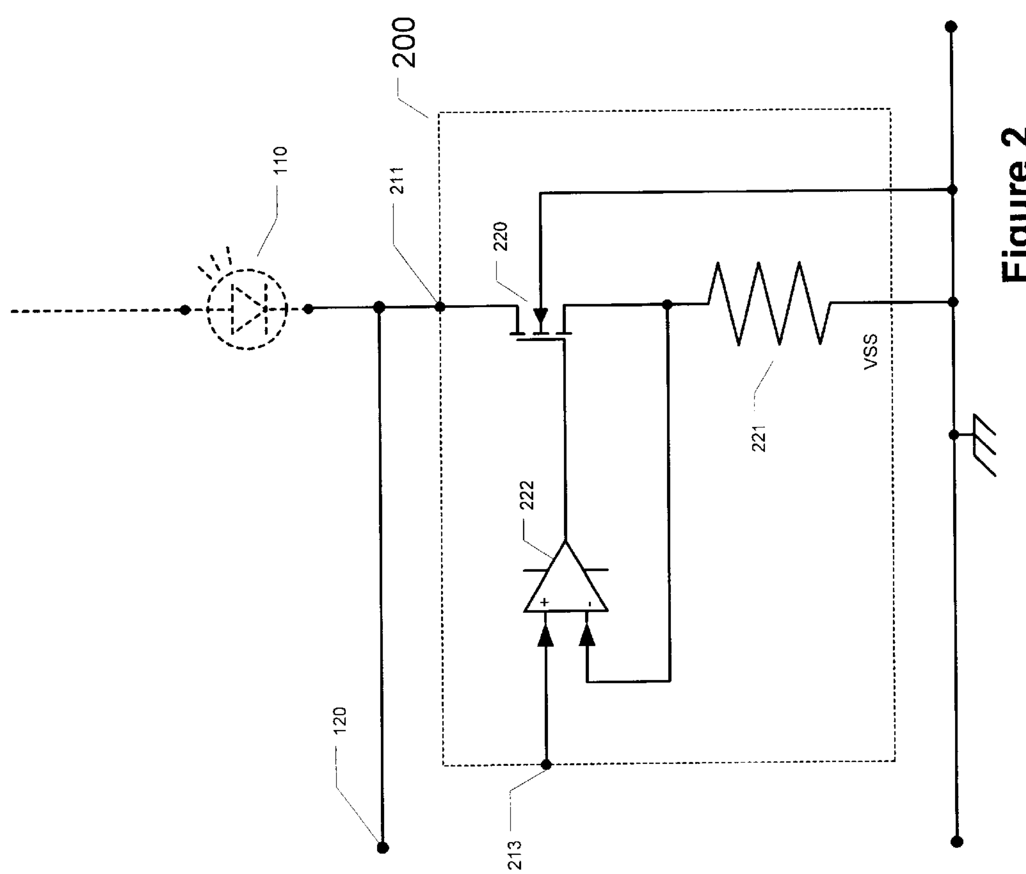
FIG. 2 is a schematic diagram of a current regulator according to an embodiment of the invention.

FIG. 2 is a schematic diagram of a current regulator 200 according to an embodiment of the invention. The current regulator 200 may be connected to an LED 110. The current regulator 200 sinks current at the input terminal 211 and tends to operate as a constant current load. As such current regulator 200 is suitable for controlling current through LED 110 which may be connected to input terminal 211. Op Amp 222 operates as a voltage follower with a reference voltage provided at reference terminal 213 to control FET 220 to maintain a fixed voltage across resistor 221, and hence maintain a fixed current through resistor 221. The same fixed current flows through external LED 110. A low voltage device may be used for FET 220 so that the current regulator drops only about 700 mV for good overall circuit efficiency. In the event that the LED supply is providing insufficient current then current starvation in current regulator 200 will occur and this may be sensed externally at terminal 120 as under-voltage at input terminal 211.

Figure 3:
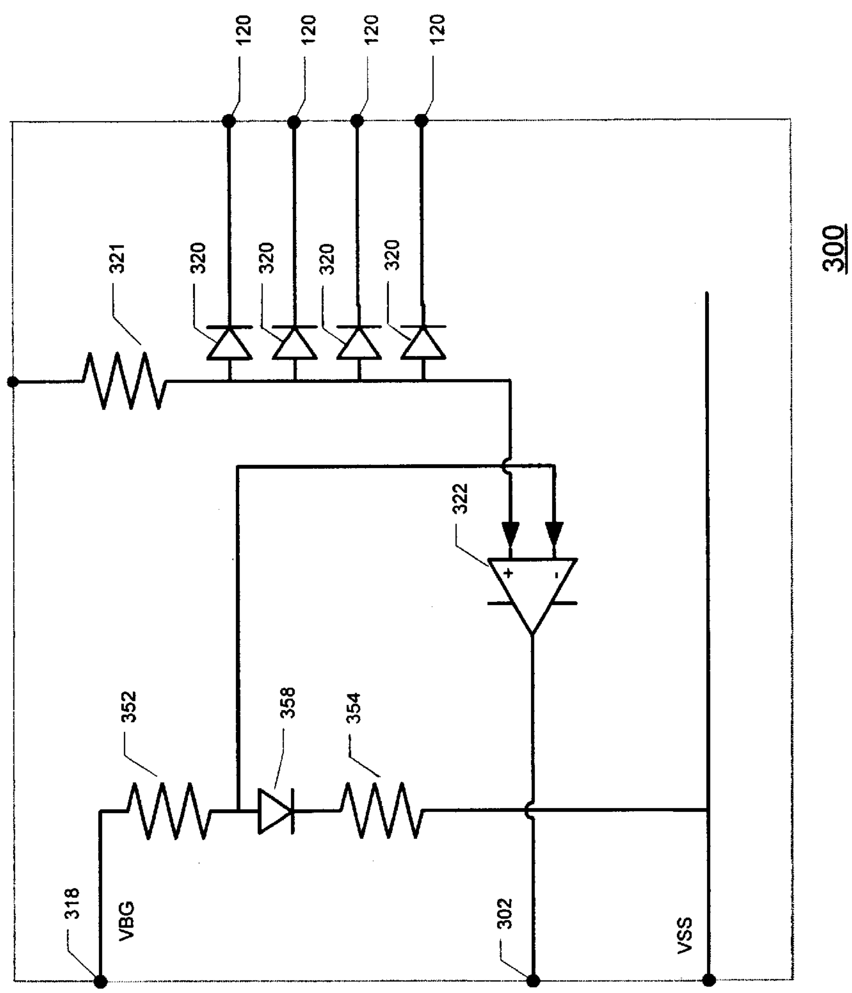
FIG. 3 a schematic diagram of an under-voltage detector according to an embodiment of the invention.

FIG. 3 a schematic diagram of an under-voltage detector 300 according to an embodiment of the invention. Detector 300 receives bandgap reference voltage VBG at terminal 318. Bipolar diodes 320 operate as a wired-OR with pull-up resistor 321 to provide to OpAmp 322 a voltage at a fixed offset from the lowest of the voltages presented at the sense terminals 120. Bipolar diodes having a low threshold voltage may be used in an embodiment for wired-OR diodes 320. Resistors 352 and 354 act together with diode 358 to provide a reference voltage for OpAmp 322 that is compensated for temperature variance in the circuit. Diodes 120 and 358 may typically be implemented in the same technology, such as bipolar, and/or on a common substrate for good temperature tracking. Op Amp 322 generates a feedback level signal at terminal 302, which is used in a closed loop control to ensure that the lowest of the voltages sensed at terminal 120 is held at the correct and near optimal value.

In an embodiment described above, when the circuit is operating normally, the current through each of the four LEDs 110 will be equal, but the voltages across them will depend upon individual device characteristics. Under this condition, one of the four LEDs will develop the highest voltage and correspondingly, the respective current regulator 200 will develop the minimum voltage required to sustain the desired current. This minimum voltage will be the voltage sensed by the detector 300. The other LEDs 110 will develop lower voltages and their respective current regulators 200 will develop correspondingly higher voltages.

Embodiments of the invention as described herein have significant advantages over previously developed implementations. For example, an embodiment disclosed above provides, as compared with previously developed solutions, a superior tradeoff between cost, uniformity and controllability of illumination intensities, energy efficiency, tolerance of wide LED operating voltages, wide power supply variations and wide component tolerances and support for multiple LEDs.

As will be apparent to one of ordinary skill in the art, other similar circuit arrangements are possible within the general scope of the invention. For example, the invention need not be limited to processes providing field-effect transistors and bipolar diodes, various other types of active and non-linear devices such as JFETs (junction FETs) may be employed within the general scope of the invention. As another example, the various channels may be intentionally arranged to carry independently differing currents at the same bias voltages, such independently differing currents may be fixed or adjustable also. Even embodiments with discrete components may be within the general scope of the invention. The embodiments described above are intended to be exemplary rather than limiting and the bounds of the invention should be determined from the claims.

What is claimed is:

1. A circuit for providing current to a plurality of LEDs, the circuit comprising:

a plurality of current regulators, each current regulator operable to control current in a respective one of the LEDs;

a charge pump terminal operable to supply current to the plurality of LEDs;

a voltage regulator operable to supply energy to the charge pump; and a detector operable to detect occurrence of a condition selected from a list consisting of current starvation and incipient current starvation at any of the current regulators;

wherein the voltage regulator has an output that is responsive to detection of the condition of current starvation.

2. The circuit of claim 1 wherein the charge pump has at least two operating modes, each operating mode having a respective voltage gain, and wherein one of the at least two operating modes is selected in response to detection of the condition.

3. The circuit of claim 1 wherein the detector comprises a wired-OR circuit arrangement.

4. The circuit of claim 1 wherein the detector comprises bipolar diodes and the plurality of current regulators comprises field effect transistors.

5. The circuit of claim 4 wherein the detector receives a bandgap reference voltage and further comprises a temperature compensating diode and a comparator.

6. The circuit of claim 2 further comprising a mode latch operable to control selection of an active operating mode from the at least two operating modes.

7. The circuit of claim 6 wherein the charge pump has at least three operating modes.

8. The circuit of claim 1 wherein the current regulators carry independently differing currents.

9. A circuit for providing current to a plurality of LEDs, the circuit comprising:

means for regulating current in each of the LEDs;

means for supplying current to the plurality of LEDs;

means for regulating the means for supplying current; and means for detecting occurrence of a condition selected from a list consisting of current starvation and incipient current starvation at the means for regulating current;

wherein the regulating is responsive to the detecting.

10. The circuit of claim 9 wherein the means for regulating comprises a charge pump, the charge pump having multiple modes, each mode having a respective voltage gain.

11. The circuit of claim 9 wherein the means for regulating comprises a linear voltage regulator.

12. The circuit of claim 9 wherein the means for detecting comprises a wired-OR of bipolar diodes and the means for limiting current comprises a field effect transistor.

13. A method for providing current to a plurality of LEDs comprising:

regulating current in each of the LEDs to not exceed a desired amount;

detecting a condition selected from a list consisting of current starvation and incipient current starvation in any of the LEDs; and regulating a voltage supplied to the plurality of LEDs in response to the detecting so that the current starvation is abated.

14. The method of claim 13 wherein the regulating of a voltage is performed using a multi-mode charge pump.

15. The method of claim 14 wherein the regulating of a voltage is further performed using a linear voltage regulator.

* * * * *